United States Patent
Worrell

(10) Patent No.: US 6,948,054 B2
(45) Date of Patent: Sep. 20, 2005

(54) SIMPLE BRANCH PREDICTION AND MISPREDICTION RECOVERY METHOD

(75) Inventor: Frank Worrell, San Jose, CA (US)

(73) Assignee: LSI Logic Corporation, Milpitas, CA (US)

(*) Notice: Subject to any disclaimer, the term of this patent is extended or adjusted under 35 U.S.C. 154(b) by 587 days.

(21) Appl. No.: 09/726,144

(22) Filed: Nov. 29, 2000

(65) Prior Publication Data

US 2002/0066006 A1 May 30, 2002

(51) Int. Cl.$^7$ ................................................. G06F 9/38
(52) U.S. Cl. ........................................ 712/237; 712/234
(58) Field of Search .............................. 712/206, 207, 712/212, 234, 235, 237

(56) References Cited

U.S. PATENT DOCUMENTS

| | | | | |
|---|---|---|---|---|
| 5,509,130 A | * | 4/1996 | Trauben et al. | 712/215 |
| 5,951,678 A | * | 9/1999 | Moyer | 712/237 |
| 6,044,460 A | * | 3/2000 | Eckner et al. | 712/244 |
| 6,088,793 A | * | 7/2000 | Liu et al. | 712/239 |
| 6,330,664 B1 | * | 12/2001 | Halvarsson | 712/239 |
| 6,493,821 B1 | * | 12/2002 | D'Sa et al. | 712/239 |
| 6,678,820 B1 | * | 1/2004 | Kahle et al. | 712/239 |

OTHER PUBLICATIONS

Computer Organization and Design—The Hardware/Software Interface, 2nd Edition, John L. Hennessy and David A. Patterson, Morgan Kaufmann Publishers, 1998; pp. 148, 404, 506, and 509.*

John L Hennessy and David A Patterson; Computer Organization and Design The Hardware/Software Interface; Morgan Kaufman Publishers; 1998; pp. 148, 404, 506, and 509.*

The Authoritative Dictionary of IEEE STandard Terms; Standards Information Network; 7$^{th}$ Edition; 2000; p. 949.*

John L Hennessy and David A Patterson; Computer Organization and Design—The Hardware/Software Interface; 1998; Morgan Kaufman Publishing; 2nd Edition; pp. 385 and 404.*

* cited by examiner

*Primary Examiner*—William M. Treat
(74) *Attorney, Agent, or Firm*—Christopher P. Maiorana PC

(57) ABSTRACT

A method of conditional branching in a pipelined processor. The method comprising the steps of (A) prefetching a branch target address in response to encountering a branch instruction, in prediction of taking a branch, and (B) evaluating between (i) taking the branch and (ii) not taking the branch substantially contemporaneously with prefetching the branch target address.

8 Claims, 3 Drawing Sheets

SIMPLE BRANCH PREDICTION AND MISPREDICTION RECOVERY METHOD

FIELD OF THE INVENTION

The present invention relates to branch prediction generally and, more particularly, to a method and/or architecture for implementing branch prediction and misprediction recovery in a pipelined processor.

BACKGROUND OF THE INVENTION

In the MIPS instruction set, the most important conditional branch instruction includes a 64-bit comparison. Very often the comparison depends on results that were computed or loaded from memory by instructions immediately preceding the branch. The direct approach bypasses the computed or loaded results, does a 64-bit comparison, and uses the comparison result to select either the branch target address or the sequential instruction address. Unfortunately, the delay of this result, bypass, compare, and address select path limits the maximum clock frequency and thus the maximum performance of the CPU.

Many branch prediction methods have been proposed or implemented. In general, these prediction methods are all designed for use in deep pipelines that have high misprediction penalties. The high mispredict penalty requires complex prediction logic to achieve the high prediction accuracy needed for acceptable performance. What is desired is an approach and architecture for a shallow pipelined where the penalty for misprediction is low.

SUMMARY OF THE INVENTION

A method of conditional branching in a pipelined processor, the method comprising the steps of (A) prefetching a branch target address in response to encountering a branch instruction, in prediction of taking a branch, and (B) evaluating between (i) taking the branch and (ii) not taking the branch substantially contemporaneously with prefetching the branch target address.

The objects, features and advantages of the present invention include providing a method and/or an architecture for branch prediction for a pipelined processor where (i) the prediction is to always take the branch; (ii) the overall clock frequency of the system is not limited; and/or (iii) the system may be implemented using a minimum amount of hardware.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
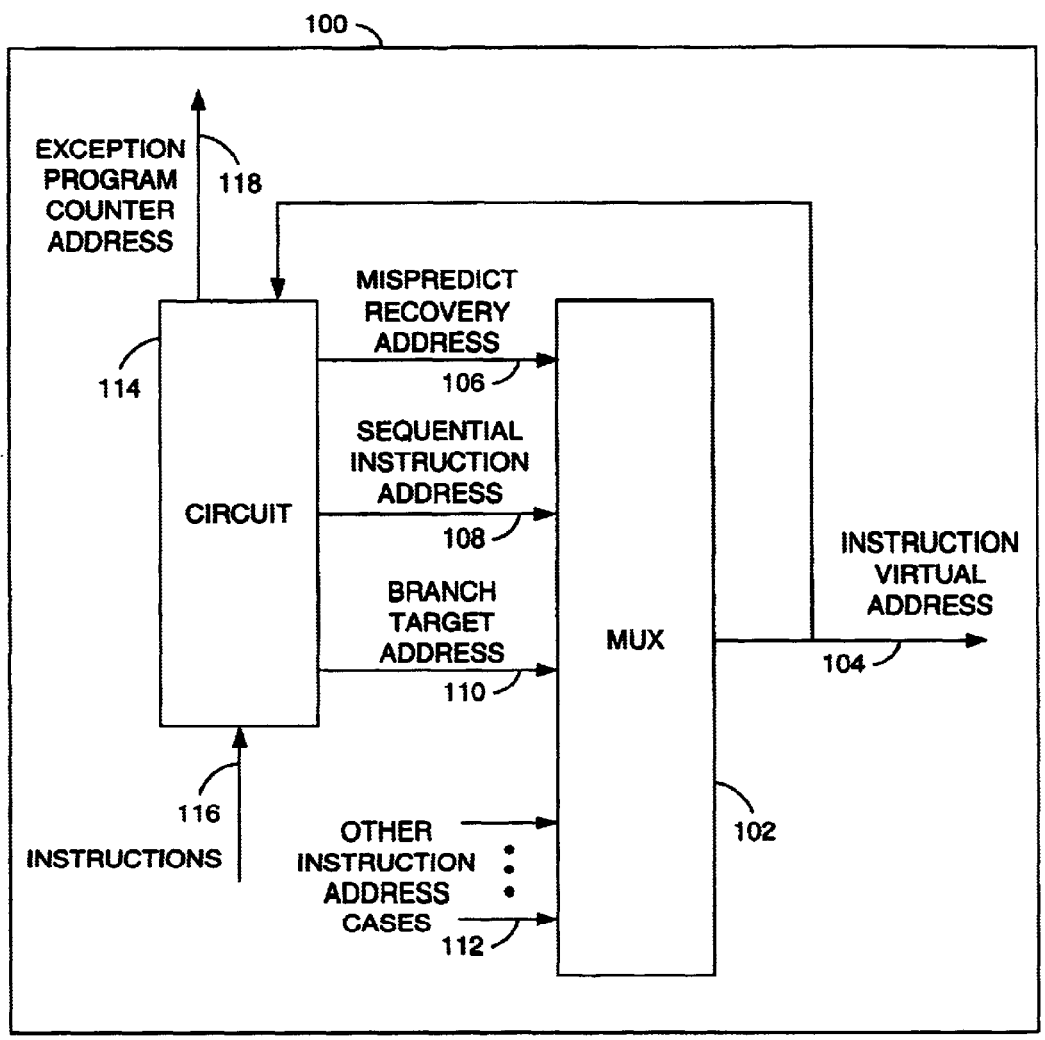
FIG. 1 is a block diagram of a preferred embodiment of the present invention.

The present invention concerns an architecture and method of operating a pipelined processor to handle conditional branching instructions. The present invention assumes that the prediction will generally be to take the branch. This may result in good branch performance without limiting a clock frequency of the pipelined processor or without requiring significant branch prediction/misprediction recovery hardware.

In operation, a branch instruction may be decoded in a decode/register-fetch stage of the pipelined processor. A branch target address may be generated in the decode/register-fetch stage. While the branch target address is being prefetched, the branch condition may be evaluated in an execution stage of the pipelined processor. If the branch condition is evaluated as taking the branch, then prefetching generally continues with a sequential instruction address that takes the branch target. If the branch condition is evaluated as not taking the branch, then the prefetched branch target may be discarded and a predict recovery address may be prefetched.

A prefetch program counter in the decode/register-fetch stage generally stores a program counter address of an instruction being fetched. An instruction register generally stores the branch instruction. The branch target address may be generated as a sum of the program counter address and an address displacement in the branch instruction. A multiplexer may present the branch target address to a prefetch stage of the pipelined processor and back to the prefetch program counter.

An incrementor may add a predetermined offset to the contents of the prefetch program counter to produce the sequential instruction address. An exception program counter may be coupled to the prefetch program counter to retain the program counter of the decode/register-fetch stage. A second incrementor may add a second predetermined offset to the contents of the exception program counter to produce the mispredict recovery address. In an alternative embodiment, the mispredict recovery address may be derived from the execution stage exception program counter instead of a decode/register-fetch stage exception program counter.

Analysis of typical MIPS code (MIPS Technologies, Inc. of Mountain View, Calif.) has shown that conditional branches are taken 75% to 80% of the time. This is especially true for tight software loop cases. In tight loops, a prediction that the branch will be taken is always correct, except for the last iteration. The present invention utilizes the high probability of taking the branch to provide a hardware efficient branch prediction method of always taking the branch.

The MIPS instruction set architecture (ISA) provides a set of rules that can be exploited to make recovery from a misprediction simple. In particular, the MIPS ISA requires a branch-delay slot to follow a conditional branch instruction. The branch-delay slot may have a no-operation instruction or an instruction from the current thread that can execute before the branch takes effect. Furthermore, MIPS ISA does not allow for two consecutive conditional branch instruction. As a result, the instruction in a branch-delay slot will not be another conditional branch instruction.

Referring to FIG. 1, a portion of a system 100 illustrating utilization of the MIPS ISA by the present invention is shown. The system 100 shows a portion of a decode/register-fetch stage (also called an R-stage) in a multi-stage pipelined processor. A fetch stage (F-stage)(not shown) and execute stage (X-stage)(not shown) may preceded and follow the R-stage, respectively.

The R-stage generally includes a multiplexer 102 for providing an instruction virtual address on an output bus 104 to the fetch stage. The instruction virtual address may be selected from any one of several inputs buses. Inputs to the multiplexer 102 include, but are not limited to, a mispredict recovery address on an input bus 106, a sequential instruction address on an input bus 108, a branch target address on an input bus 110, and other instruction address cases on one or more input buses 112.

The circuit 114 is generally responsible for detecting a conditional branch instruction from among the instructions received on a bus 116. The circuit 114 may also receive as an input the instruction virtual address presented by the multiplexer 102 on the output bus 104. Using these inputs, the circuit 114 may generate the mispredict recovery address, sequential instruction address, and branch target address. The circuit 114 presents an exception program counter address on a bus 118 that is part of an exception program counter chain of registers.

Figure 2:
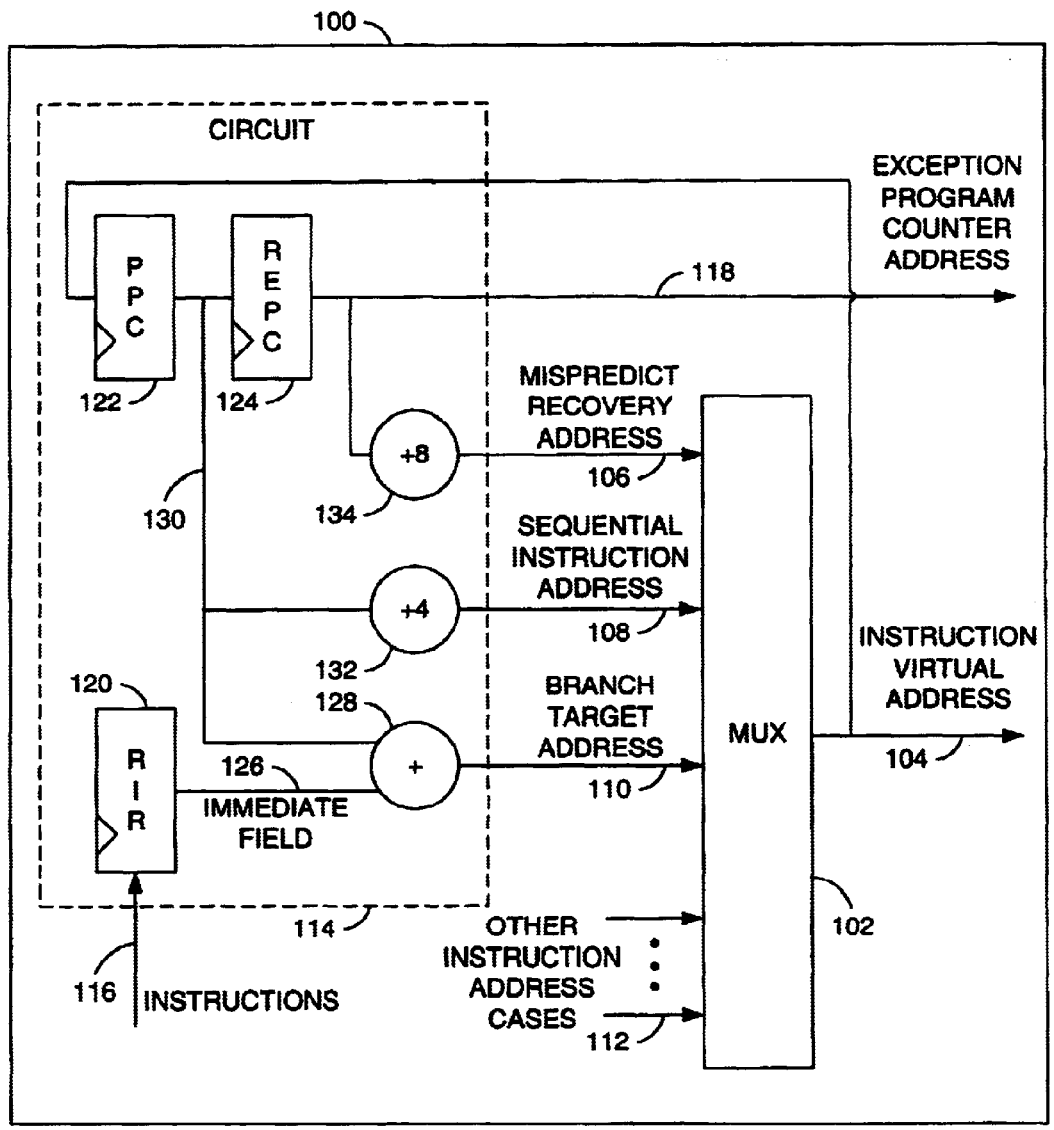
FIG. 2 is a detailed block diagram of a preferred embodiment of the present invention.

Referring to FIG. 2, a more detailed diagram of the circuit 114 is shown. An R-stage instruction register (RIR) 120 may be provided to store the instructions received on bus 116, one instruction at a time. A prefetch program counter (PPC) 122 may be provided to store a program counter address associated with the instruction stored in the RIR 120. The PPC 122 is generally configured to store at least the instruction virtual address from the output bus 104 of the multiplexer 102. An R-stage exception program counter (REPC) 124 may be coupled to the PPC 122. The REPC 124 maintains the program counter address stored in the PPC 122 within the R-stage 100 for one additional cycle of the pipeline. As mentioned above, the exception program counter address stored in the REPC may be presented from the circuit 114 on the bus 118.

The circuit 114 is generally responsible for detecting a conditional branch instruction loaded into the RIR 120. When a conditional branch instruction is detected, the RIR 120 may present an immediate (IMM) field on the bus 126. An IMM field in the MIPS ISA contains a branch displacement or address displacement from the current program counter address. The IMM field may be entered into an adder 128. The adder 128 may also receive the program counter address stored in the PPC 122 on the bus 130. The sum of the IMM field and program counter address for the conditional branch instruction is the branch target address.

The circuit 114 may generate the sequential instruction address using the program counter address stored in the PPC 122. In the MIPS ISA, all instructions have a fixed length of four bytes. Consequently each subsequent instruction address may be offset from a current address by four bytes. An incrementor 132 may add a predetermined offset of four bytes to the program counter address in the PPC 122 to produce the sequential instruction address on bus 108. Other predetermined offsets besides four bytes may be used within the present invention to meet the design criteria of a particular implementation. For example, other offsets may be used to accommodate other ISAs having other instruction lengths.

The MIPS ISA defines that each conditional branch instruction is followed by a branch-delay slot. Branch-delay slots may have a no-operation instruction or an instruction from the current thread that can execute before the branch takes effect. The next instruction immediately following each branch-delay slot is executed if the branch condition is false. This next instruction may be at an address offset by eight bytes from an address of the conditional branch instruction. Should an evaluation of the branch condition determine that the branch should not be taken, then the next instruction that should be executed may reside at a second predetermined offset (e.g., eight bytes) from the current address. Here, the address of the next instruction is generally referred to as the mispredict recovery address.

A second incrementor 134 may be provided in circuit 114 to produce the mispredict recovery address. The second incrementor 134 may add the second predetermined offset to the exception program counter address stored in the REPC 124 to produce the mispredict recovery address. As with the first predetermined offset, the second predetermined offset may be adjusted to other than eight bytes to accommodate other ISAs.

Figure 3:
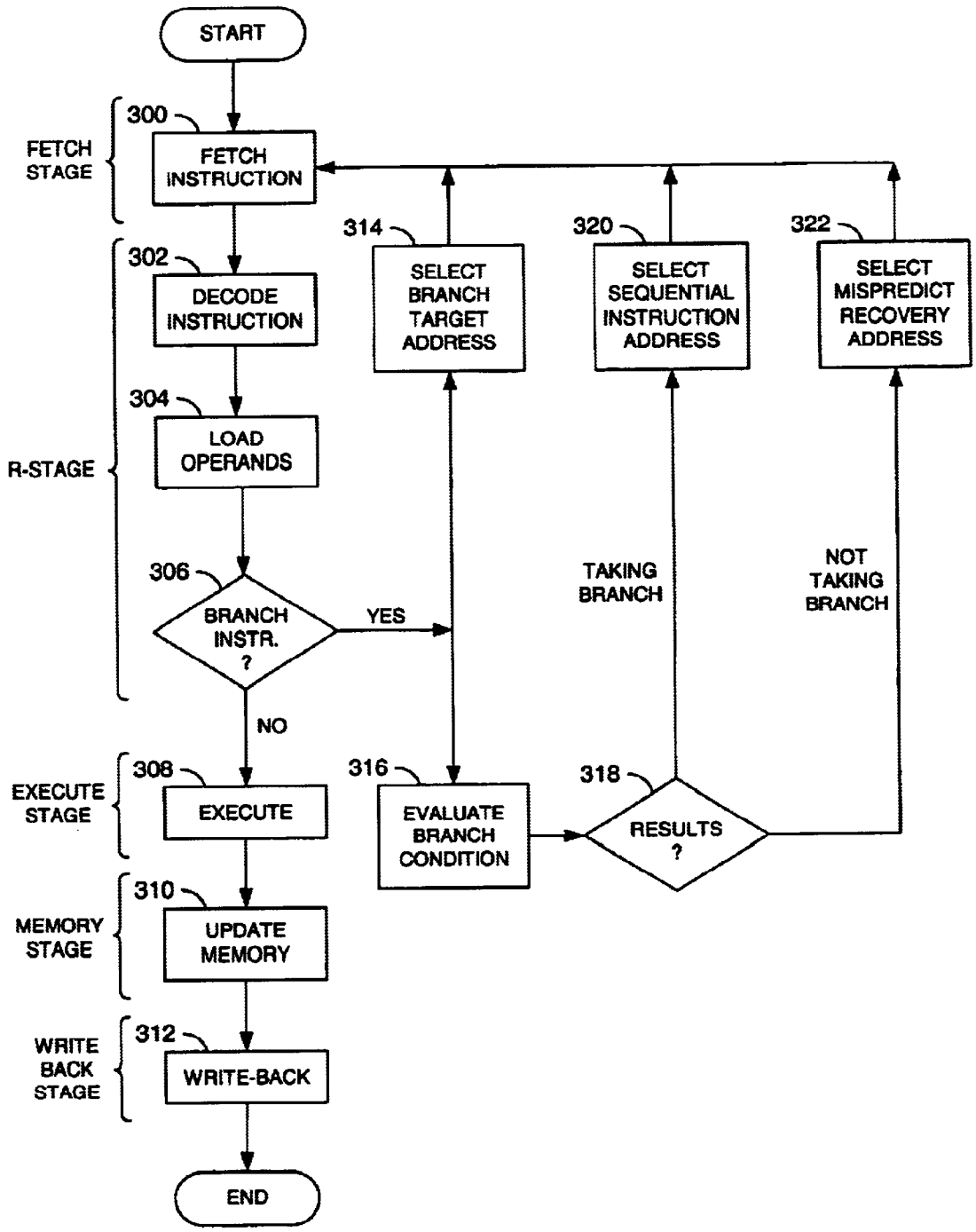
FIG. 3 is a flow diagram of a method for branch prediction and misprediction recovery.

FIG. 3 illustrates an operation of the pipelined processor encountering a conditional branch instruction. The process starts with an instruction being fetched from memory by the fetch stage of the pipelined, as shown in block 300.

The fetched instruction may be decoded by the R-stage, as shown in block 302. Operands for the instruction, if any, may then fetched, as shown in block 304. The instruction may be loaded into the RIR 120 and examined to determine if the instruction is a conditional branch instruction, as shown by decision block 306. If the instruction is not a conditional branch instruction, the NO branch of decision block 306, then the process generally continues in the execution stage with executing the instruction, as shown in block 308. Data resulting from the execution then flows to the memory stage where the data may be used to update the cache memory, as shown in block 310. Finally, a write-back stage generally makes data available from the memory stage to the other stages, as shown in block 312.

Where the instruction is decoded as a conditional branch instruction, then the YES branch of decision block 306 will be taken. Adder 128 (FIG. 2) adds the IMM field to the program counter address stored in the PPC 122 to produce the branch target address, as shown in block 314. The branch target address may then be flowed back to the fetch stage to load the first instruction at the branch target. This is consistent with the approach of predicting to always take the branch.

While the branch target address is being generated and fetched, the execution stage may evaluate the branch condition, as shown in block 316. This evaluation may be performed substantially contemporaneously with the generation of the branch target address. In practice, the evaluation may be preformed slightly before, simultaneously with, or slightly after the branch target address generation. The result of the branch condition evaluation is to either take the branch or not take the branch.

Referring back to FIG. 2 and FIG. 3, consider situations where the branch condition evaluation has determined that the always-take-the-branch prediction was correct (e.g., the TAKING BRANCH path from decision block 318). In the next clock cycle, the branch target address presented by the multiplexer 102 may be stored in the PPC 122. Next, the associated instruction may be loaded into the RIR 120 from the fetch stage. The incrementor 132 may then add the predetermined offset (e.g., four bytes) to the base target address to produce the sequential instruction address, as shown in block 320. The sequential instruction address may then flow back to the fetch stage to fetch the next instruction.

In some situations, the branch condition evaluation will determine that the prediction to take the branch was incorrect (e.g., the NOT TAKING BRANCH path from decision block 318). Here, the address stored in the PPC 122 is incorrect. To recover from this misprediction, the R-stage may discard or ignore the address loaded in the PPC 122. The second incrementor 134 may add the second predetermined offset (e.g., eight bytes) to the address of the conditional branch instruction address to produce the mispredict recovery address, as shown in block 322. The mispredict recovery address may then flow back to the fetch stage where the correct instruction is fetched. In the next clock cycle, the correct instruction may be loaded into the RIR 120 for decoding. At this point, the pipelined has recovered from the misprediction and may continue operating as usual.

The functions performed by the flow diagram of FIG. 3 may be implemented in a conventional general purpose processor according to the teaching of the present invention, as will be apparent to those skilled in the relevant arts. The present invention may be implemented by the preparation of ASICs, FPGAs, or by interconnecting an appropriate network of conventional components circuits that will be readily apparent to those skilled in the arts.

While the invention has been particularly shown and described with reference to the preferred embodiments thereof, it will be understood by those skilled in the art that various changes in form and details may be made without departing from the spirit and scope of the invention.

What is claimed is:

1. A method of conditional branching in a pipelined processor, the method comprising the steps of:

(A) fetching a first instruction stored at a branch target address in response to encountering a branch instruction at a program counter address;

(B) decoding a second instruction stored at a next address immediately following said program counter address during a same pipeline cycle as said fetching;

(C) evaluating between (i) taking a branch defined by said branch instruction and (ii) not taking said branch during said same pipeline cycle as said fetching; and (D) fetching a third instruction stored at a mispredict recovery address immediately following said next address in response to determining not to take said branch.

2. The method of claim 1, further comprising the step of:

(D) fetching a fourth instruction stored at a sequential instruction address immediately following said branch target address in response to determining to take said branch.

3. The method of claim 2, further comprising the step of:
   generating said sequential instruction address based upon said program counter address and a predetermined offset.

4. The method of claim 1, further comprising the step of:
   generating said misprediction recovery address based upon an exception program counter address and a predetermined offset.

5. The method of claim 1, further comprising the step of:
   generating said branch target address based upon said program counter address and an address displacement of said branch instruction.

6. The method of claim 2, further comprising the steps of:
   generating said sequential instruction address immediately following said branch target address based upon said program counter address and a first predetermined offset;
   generating said mispredict recovery address immediately following said next address based upon an exception program counter address and a second predetermined offset; and
   generating said branch target address based upon said program counter address and an address displacement of said branch instruction.

7. The method of claim 1, further comprising the step of:
   storing said program counter address for said branch instruction in a stage of said pipelined processor for at least two pipeline cycles.

8. A pipelined processor comprising:
   means for decoding a first instruction stored at a next address immediately following a program counter address;
   means for fetching a second instruction stored at a branch target address in a same pipeline cycle as said decoding in response to encountering a branch instruction at said program counter address;
   means for evaluating between (i) taking a branch defined by said branch instruction and (ii) not taking said branch during said same pipeline cycle as said fetching; and
   means for fetching a third instruction stored at a mispredict recovery address immediately following said next address in response to determining not to take said branch.

* * * * *